United States Patent [19]

Underwood

[11] Patent Number: 5,681,603
[45] Date of Patent: Oct. 28, 1997

[54] METHOD OF PREPARING A SMOKE COMPOSITION FROM A TAR SOLUTION

[75] Inventor: Gary L. Underwood, Manitowoc, Wis.

[73] Assignee: Red Arrow Products Co., Inc., Manitowoc, Wis.

[21] Appl. No.: 536,515

[22] Filed: Sep. 29, 1995

[51] Int. Cl.[6] ................................................. A23L 1/015
[52] U.S. Cl. ......................... 426/271; 426/422; 426/534; 426/650
[58] Field of Search .................................. 426/250, 271, 426/422, 650, 490, 534; 210/690, 692, 661

[56] References Cited

U.S. PATENT DOCUMENTS

| | | | |
|---|---|---|---|
| 3,106,473 | 10/1963 | Hollenbeck. | |
| 4,359,481 | 11/1982 | Smits et al. | 426/650 X |
| 4,446,167 | 5/1984 | Smith et al. | 426/650 |
| 4,504,501 | 3/1985 | Nicholson | 426/650 X |
| 4,609,559 | 9/1986 | Nicholson | 426/650 |
| 4,959,232 | 9/1990 | Underwood | 426/271 |
| 4,994,297 | 2/1991 | Underwood et al. | 426/650 |
| 5,039,537 | 8/1991 | Underwood | 426/271 |

OTHER PUBLICATIONS

P. Simko et al., *Potravinarske Vedy*, 12(3) (1994), pp. 175–184 (abstract only).

*Primary Examiner*—Arthur L. Corbin
*Attorney, Agent, or Firm*—Marshall, O'Toole, Gerstein, Murray & Borun

[57] ABSTRACT

A smoke coloring and flavoring composition containing about 10 ppb or less benzo(a)pyrene, and its method of preparation by contacting a water-insoluble tar by-product from the pyrolysis of wood with a nonionic resin.

27 Claims, No Drawings

METHOD OF PREPARING A SMOKE COMPOSITION FROM A TAR SOLUTION

FIELD OF THE INVENTION

The present invention is directed to smoke coloring and flavoring compositions prepared from a tar by-product of wood pyrolysis. The compositions have a high color value and contain 10 parts per billion or less of benzo(a)pyrene. In particular, the present invention is directed to solubilizing the water-insoluble by-product of wood pyrolysis in an aqueous alkali, then removing nonpolar hydrocarbons, such as benzo(a)pyrene, from the solubilized tar by-product. The resulting smoke coloring and flavoring compositions are used to color and flavor edible foodstuffs.

BACKGROUND OF THE INVENTION

Using a liquid smoke and flavoring composition, referred to hereafter as "a liquid smoke composition," as a replacement for smoking food by direct contact with wood smoke has become a standard industry practice. When applied to the surface of meats and other proteinaceous foodstuffs, a liquid smoke composition imparts a characteristic smoke flavor and a dark smoked color to a foodstuff. The preparation of a smokehouse-like foodstuff by applying an aqueous liquid smoke composition to a foodstuff requires controlling and balancing many related variables, such as the foodstuff composition, temperature, humidity, processing and contact time, and amount and concentration of applied liquid smoke composition.

Wood smoke itself is a complex and variable mixture of compounds produced during wood pyrolysis, and includes numerous vaporous compounds which are liquids at room temperature. Pyrolysis is a general term for the thermal decomposition of an organic material, such as wood, plants, and fossil fuels, either during combustion or in the absence of combustion. Combustion pyrolysis uses the oxidation or burning of a portion of the organic material to provide the thermal energy required to vaporize and decompose the remainder of the organic material. For pyrolysis without combustion, thermal energy is supplied indirectly from an external source, such as radiation, solid or gaseous heat carriers, or thermal conduction through reactor walls. The energy supplied by an external source vaporizes and decomposes the organic material without directly burning the organic material.

Either method of pyrolysis produces liquids (i.e., condensable vapors), gases (i.e., noncondensable vapors) and solids (i.e., char and ash) in varying proportions depending upon feed material and pyrolysis conditions. The condensed liquids can be further subdivided into water-soluble organic compounds and water-insoluble tars. It is known that the desirable active ingredients for flavoring and coloring foodstuffs are present in the water-soluble condensed liquids. The water-insoluble tars have been considered a useless by-product of wood pyrolysis and discarded.

The water-insoluble tars are intractable, flowable, high viscosity liquids that contain a relatively high concentration of carcinogenic aromatic hydrocarbons. As a result, the tars traditionally have been discarded because the tars could not be applied to foodstuffs as is, and could not be converted into a composition useful for application to foods. Tar disposal also has been troublesome and expensive because of the presence of carcinogenic hydrocarbons. Therefore, it would be desirable to find a commercial form, and a commercial use, for the water-insoluble tars, and to substantially reduce the volume of discarded tars. Furthermore, as used here and hereafter, the terms "tar" and "water-insoluble tar" refer to condensable, water-insoluble wood pyrolysis products, as opposed to the ash and char that are not pyrolysis products, but remain in the wood pyrolysis reactor. In addition, as used here and hereafter, the term "hydrocarbon" is defined as a compound containing essentially only carbon and hydrogen, i.e., a compound containing about 95% or more atomic mass units (a.m.u.) of carbon and hydrogen combined.

The color and flavor chemistry of liquid smoke compositions is highly complex, as evidenced by the over four hundred compounds identified as constituents of liquid smoke compositions. While there are hundreds of different chemical species present in liquid smoke compositions, the useful water-soluble components of a liquid smoke composition generally are divided into classes based on compounds having distinct functional groups. These classes are acids, carbonyls, phenolics, and basic and neutral constituents. In general, phenolics are the primary flavoring compounds, carbonyls are the primary coloring compounds, and acids are primarily preservatives and pH controlling agents. The acids and carbonyls also make a secondary contribution to flavor and enhance the surface characteristics of smoked foodstuffs.

Some of these useful compounds also are present in the water-insoluble tar. The tars contain about 90% by weight organic compounds, including about 25% by weight phenolics. However, because of the intractable nature of the tar, and the very high concentration of benzo(a)pyrene (e.g., measured up to 3000 ppb), the tars have not been used commercially. The useful coloring and flavoring compounds present in tar, therefore, are wasted.

For commercially-produced aqueous liquid smoke compositions, production begins with smoke made by the combustion and pyrolysis of wood in a limited oxygen atmosphere. After pyrolysis, the smoke is collected and fed through a column countercurrent to a flow of recirculating water. A typical commercial liquid smoke composition for application to a foodstuff, like meat, is an aqueous smoke flavoring described in Hollenbeck U.S. Pat. No. 3,106,473.

Current conventional pyrolysis methods are characterized by relatively slow thermal reactions which occur at moderate temperatures. In a typical commercial process, for example, a wood feedstock, generally dried ground sawdust, is fed into a pyrolysis reactor at elevated temperatures. A typical average reactor temperature is about 420° C. Depending on the method of heating, the temperature gradient in the pyrolysis reactor varies from about 600° C. at the heater to about 250° C. at the bulk wood surface. Residence times of solids (wood/char) and vapors are about 10 minutes and 1 minute, respectively. Diluting the condensable smoke components with water results in the separation of undesirable polymers and water-insoluble components, i.e., the water-insoluble tars, from the aqueous liquid smoke composition.

In the preparation of a commercial liquid smoke composition, the water-insoluble tars separate from the liquid smoke composition while the liquid smoke composition is held in a storage tank for a length of several days to several weeks. Water-insoluble hydrocarbons, like polynuclear aromatic compounds, are unavoidable contaminants associated with the pyrolysis of wood. The major portion of the hydrocarbons settles out of the liquid smoke composition with the tar, and, like the tar, is physically separated from the liquid smoke composition.

Conventional slow pyrolysis methods produce liquid, gas, and char yields which typically are about 35%, 35%, and 30% by weight of the mass of the wood feedstock, respectively. Because the water-insoluble tars constitute about 50% and about 65% by weight of the total liquids derived from the wood content, the net yield of raw liquid smoke composition is relatively low (i.e., about 12% to about 20% of the wood feedstock). It would be advantageous to find a commercial use for the about 15% to about 25% by weight tars that are produced from the wood feedstock.

Traditionally, the water-insoluble tar, after isolation from the liquid smoke composition, is discarded. As demonstrated hereafter, the present invention is directed to a method of preparing a smoke coloring and flavoring composition from this water-insoluble tar by-product, thereby providing a commercially useful product and substantially reducing the volume of discarded tar.

As stated above, water-insoluble tars contain in excess of 1000 ppb of benzo(a)pyrene. Many polynuclear aromatic compounds, including benzo(a)pyrene, are known carcinogens. Therefore, it is important to reduce the polynuclear aromatic content of any composition used to contact a foodstuff as much as possible. Specifically, it is important to reduce the concentration of benzo(a)pyrene, which is known as a potent carcinogen, to about 10 ppb or less, and preferably to about 1 ppb or less.

Workers also have had difficulty removing solubilized benzo(a)pyrene from highly concentrated liquid smoke compositions because the hydrocarbons are solubilized in the composition by the high percentage of organic compounds. The present method provides smoke coloring and flavoring compositions prepared from water-insoluble tars having a benzo(a)pyrene content of about 10 ppb or less, even though the benzo(a)pyrene is solubilized in the tar.

The pyrolysis method of producing liquid smoke compositions, therefore, suffers from relatively low yields of desirable smoke and flavoring compounds and relatively high yields of undesirable water-insoluble tars which contain relatively high amounts of carcinogenic hydrocarbons, like benzo(a)pyrene. It would be desirable to have a method of converting the water-insoluble tar by-product of wood pyrolysis into a commercially useful product, thereby reducing the amount of by-product that is discarded.

SUMMARY OF THE INVENTION

The present invention relates to a smoke coloring and flavoring composition prepared from the condensed tar by-product of the pyrolysis of wood. The smoke coloring and flavoring composition contains 10 ppb or less of benzo(a)pyrenes and has a color value of at least 200, and preferably at least 300. The method of preparing the smoke coloring and flavoring composition substantially reduces the volume of carcinogen-containing tar that must be discarded. The method, therefore, provides a commercially useful product from a heretofore discarded by-product, and substantially reduces the costs associated with disposing of the tars.

As used here and hereafter, the term "tar" refers to the condensed water-insoluble material produced during wood pyrolysis and that is separated from the liquid smoke composition. The term "smoke coloring and flavoring composition" refers to an aqueous composition prepared from a tar. The smoke coloring and flavoring composition has components and physical properties different from a liquid smoke composition, and imparts color to a foodstuff by a different mechanism.

The term "smoke coloring and flavoring composition" further is defined as the alkaline tar solution resulting from contact with a nonionic, aromatic hydrocarbon-based resin. The term "tar solution" refers to a solution of tar in an aqueous alkali. The term "at least" is defined as the minimum amount of a compound either removed from or retained in the smoke coloring and flavoring composition, and encompasses total removal from or retention in, i.e., up to 100%, the composition.

The method comprises solubilizing a water-insoluble tar in an aqueous solution of an alkali, like sodium hydroxide. The aqueous alkali contains about 5% to about 50% by weight of an alkali. Sufficient aqueous alkali is admixed with the tar to provide a solution having a pH of about 10 to about 13. After forming the solution, the solution is contacted with a nonionic, aromatic hydrocarbon-based resin to provide a smoke coloring and flavoring composition having a pH of about 10 to about 13 and a benzo(a)pyrene content of about 10 ppb or less.

The hydrocarbons, and especially the polynuclear aromatic compounds, are removed from aqueous tar solution by contacting the solution with a nonionic, aromatic hydrocarbon-based resin. Contacting the solution with the aromatic, hydrocarbon-based resin provides a smoke coloring and flavoring composition having about 10 ppb or less benzo(a)pyrene. The tar solution is contacted with the resin at a ratio of about 5 to about 50 volume parts of solution to about 1 weight part of resin, and preferably at a ratio of about 10 to about 40 volume parts of tar solution to 1 weight part resin.

The aromatic hydrocarbon-based resin removes at least about 80%, and preferably at least about 90%, of the hydrocarbons present in the tar solution. The resulting smoke coloring and flavoring composition is dark in color, having a color value of at least 200, and is applied to the surface of a foodstuff, like a casing or meat, to impart a smoke coloring to the foodstuff.

In accordance with an important aspect of the present invention, the smoke coloring and flavoring composition can be derived from the tar of a fast pyrolysis or a slow pyrolysis method. In either case, the present method produces a composition wherein the concentration of hydrocarbons in the smoke coloring and flavoring composition is reduced by at least about 80%, and preferably at least about 90%, by weight. Under optimized conditions, a reduction of hydrocarbon content by about 100% is envisioned. The nonionic, hydrocarbon-based resins utilized in the present invention are porous resins containing aromatic moieties, and have an average pore diameter of about 50 to about 500 Angstroms (Å), and a specific surface area of at least about 200 $m^2/g$ (square meters per gram), and typically about 200 to about 2000 $m^2/g$. The resins have a porosity of at least 40%, and typically about 40% to about 70%, of the bulk volume of the resin.

These and other aspects and advantages of the present invention will become apparent from the following detailed description of the preferred embodiments.

DETAILED DESCRIPTION OF THE PREFERRED EMBODIMENTS

The present invention is directed to a method of preparing a smoke coloring and flavoring composition from a water-insoluble tar by-product of the pyrolysis of wood. The method includes the step of contacting an aqueous alkaline solution of the tar with a nonionic, aromatic hydrocarbon-based resin to provide a smoke coloring and flavoring composition having a benzo(a)pyrene concentration of about 10 ppb or less. The method provides a smoke coloring and flavoring composition, wherein at least 80% of the total hydrocarbons have been removed from the tar solution. Typically, at least 90%, and often about 99%, of the total hydrocarbons have been removed from the tar solution. The smoke coloring and flavoring compositions are dark liquids and contain sufficient quantities of coloring and flavoring materials to effectively impart a smoke color and flavor to foodstuffs.

The smoke coloring and flavoring composition contains less than about 10 ppb of carcinogenic benzo(a)pyrene, and, therefore, can be concentrated, if desired, without posing an undue toxicity hazard. Preferably, the smoke coloring and flavoring composition contains about 1 ppb or less of benzo(a)pyrene, and, to achieve the full advantage of the present invention, about 0.5 ppb or less of benzo(a)pyrene. As previously stated, reduction of hydrocarbon content, and particularly benzo(a)pyrene, allows the smoke coloring and flavoring composition to be concentrated several fold, without exceeding accepted concentration limits for benzo(a) pyrene.

Examples of the tar by-product utilized in the present invention includes, but are not limited to hardwood smoke tar and hickory smoke tar, identified by CAS Registry Nos. 91722-33-7 and 121445-73-6, respectively. Such wood smoke tars are the water-insoluble portion of the volatilized products of pyrolysis and/or combustion of wood which have been condensed during the preparation of natural hardwood liquid smoke compositions. An example of the production process is found in Hollenbeck U.S. Pat. No. 3,106,473. Typically, the tars contain greater than 90% organic material and less than 10% total water extractable material. The tars are acidic, and contain up to about 25% phenolics. Examples of hardwood species that are pyrolyzed to manufacture a liquid smoke composition and generate a tar by-product include, but are not limited to, oak, hickory, maple, birch, beech, cherry, ash, poplar, and the wood portion of any number of the Carya genus.

The present method utilizing a nonionic, aromatic hydrocarbon-based resin is effective in removing hydrocarbons, like polynuclear aromatic compounds, from solutions prepared by dissolving the water-insoluble tar in an aqueous alkali. Persons skilled in the art are aware that there are different ways to contact the nonionic, aromatic hydrocarbon-based resin with a tar solution, like batch and continuous processes. The preferred method is to pass the tar solution downwardly through a column of a suitable nonionic, aromatic hydrocarbon-based resin. In this way, a maximum amount of tar solution is treated with a given amount of resin before resin regeneration is required. For both the batch and the continuous process, to effectively remove hydrocarbons from a tar solution, the ratio of volume of tar solution to weight of resin (v/w, in ml/g) is about 5 to about 50 to 1, and preferably about 10 to about 40 to 1.

Nonionic, hydrocarbon-based resins suitable for removing hydrocarbons, and especially polynuclear aromatic compounds, from tar solutions are described in the following nonlimiting examples. In general, the resins are crosslinked, aromatic hydrocarbon-based resins having a low polarity, a high porosity, and a high surface area. To achieve the full advantage of the present, the resin is nonpolar, i.e., is free of functional groups. The resins are hydrophobic and selectively remove nonpolar organic compounds, like hydrocarbons, such as benzo(a)pyrene, from aqueous dispersions, suspensions and solutions. The selective removal of nonpolar compounds permits the smoke coloring and flavoring composition to retain coloring and flavoring constituents, like phenolics. Preferred nonionic resins are crosslinked divinylbenzene resins, especially divinylbenzene-ethylvinylbenzene copolymers and divinylbenzene styrene copolymers. The resins optionally contain up to about 10% by weight of the resin of a nonionic monomer, such as, for example, an acrylic or methacrylic ester; a diester of an unsaturated dicarboxylic acid, like maleic, fumaric, crotonic, or itaconic acid.

The nonionic, aromatic hydrocarbon-based resins are hard, insoluble beads having a nominal mesh size of about 20 to about 60, a porosity of about 40% to about 70% by volume, a surface area of about 200 to about 2000 $m^2/g$, an average pore diameter of about 40 to about 500 Å, and a density of about 1 to about 1.5 g/ml (gram per milliliter). Preferred aromatic hydrocarbon-based resins have a porosity of about 40% to about 60% by volume, a surface area of about 200 to about 1000 $m^2/g$, and an average pore diameter of about 50 to about 250 Å.

In the following set of examples, various resins were tested for an ability to selectively remove hydrocarbons (i.e., benzo(a)pyrene) from a commercial liquid smoke composition. A liquid smoke composition has many of the same components as the tar solution. However, the liquid smoke composition is an acidic composition (i.e., pH about 2 to about 3), whereas the tar solution is alkaline (i.e., pH about 10 to about 13). Therefore, the tar solution contains some components, like phenolics, in a neutralized form rather than an acidic form. However, for other tar solution constituents, like hydrocarbons, the constituents are present in the same form under acidic or alkaline conditions. Therefore, removal of hydrocarbons from a tar solution can be correlated to removal of hydrocarbons from a liquid smoke solution.

The commercial liquid smoke was CHARSOL SUPREME, available from Red Arrow Products Co., Manitowoc, Wis. The CHARSOL SUPREME composition used in the following examples was not filtered after production. CHARSOL SUPREME is a composition of 42 brix. The unfiltered CHARSOL SUPREME used in the following examples had a benzo(a)pyrene concentration of 3.1 ppb, as determined by the following high performance liquid chromatography (HPLC) method. The following HPLC method also was used to assay for benzo(a)pyrene content of resin treated samples of CHARSOL SUPREME.

A 200 ml (milliliter) sample of CHARSOL SUPREME was added to a 500 ml separator funnel, followed by 50 ml of spectrophotometric grade isooctane. The resulting mixture was vigorously shaken, allowed to separate, into layers, then the lower, aqueous layer was removed and saved. The solvent layer (i.e., the isooctane layer) was drawn into stoppered flask and saved. The once-extracted CHARSOL SUPREME sample, i.e., the aqueous layer, was returned to the 500 ml separatory funnel, then extracted with a second 50 ml portion of isooctane. The extraction sequence then was repeated two more times. After the fourth extraction, the aqueous layer was discarded. The four isooctane extracts were added to the separatory funnel combined and allowed to sit for five minutes. Then, any aqueous liquid smoke composition that separated from the isooctane was removed.

The 200 ml isooctane extract then was washed three times with 50 ml portions of a 5% aqueous sodium hydroxide solution. The sodium hydroxide solution was discarded after each wash. The isooctane extract next was washed one time with 50 ml 0.2N sulfuric acid, then one time with 50 ml distilled water. The sulfuric acid and water washes also were discarded.

The washed isooctane extract was transferred into a 250 ml. Erlenmeyer flask, then filtered through 20 g (grams) anhydrous sodium sulfate (to remove traces of water) into 250 ml round-bottomed flask. The isooctane extract was evaporated to dryness in a 60° C. water bath under vacuum. The residue was quantitatively transferred with three 5 ml washings of cyclohexane into a 20 cc (cubic centimeter) syringe fitted with a Sep-Pak silica cartridge available from Waters Associates, Milford, Mass., prewetted with cycohexane. The washings were slowly forced through the cartridge with a syringe plunger into a 50 ml evaporation flask. After washing the cartridge one time with 5 ml cyclohexane, the combined washings in the flask were evaporated to dryness under vacuum in a 60° C. water bath. The residue was collected with 0.5 ml isooctane.

Twenty microliters of the residue solution then were injected onto an HPLC column. The HPLC apparatus utilizes an isocratic method with a mobile phase of 5% water and 95% acetonitrile (v/v). The HPLC apparatus contains a 3.98 mm×30 cm ODS $C_{18}$ 10μ (micron) column and a fluorescence detector. Benzo(a)pyrene elutes at 16 minutes, and is detected by fluorescence by excitation at 382 nm and at 405 nm (nanometers). Identification and quantification of benzo(a)pyrene was performed by retention time and peak height, respectively.

The ability of a resin to remove benzo(a)pyrene from a sample of CHARSOL SUPREME (unfiltered) was tested by mixing 5 volume parts (e.g., 25 ml) with one weight part of resin (e.g., 5 g), then stirring the resulting mixture at medium speed for one hour. The CHARSOL SUPREME was filtered from the resin and analyzed for benzo(a)pyrene content. Five different resins were tested for an ability to remove benzo(a)pyrene from CHARSOL SUPREME. The five resins are described in Table I.

TABLE I

| | | |
|---|---|---|
| Resin 1 | XUS-40196.00, available from Dow Chemical Co., Midland, MI, Trimethylamine functionalized, chloromethylated copolymer of styrene and divinylbenzene (DVB) in the hydroxide form, (CAS No. 069011-18-3) | |
| | Matrix Structure | Microporous styrene/DVB |
| | Type | Strong base, Type I |
| | Physical Form | Hard, white to amber beads |
| | Ionic Form | >93% Hydroxide |
| | Total Capacity | 1.0 meq/ml minimum |
| | Avg. Particle Diameter | 590 ± 50 microns; |
| Resin 2 | XUS-40285.00, available from Dow Chemical Co., Midland, MI, Dimethylamine functionalized chloromethylated copolymer of styrene and divinylbenzene (CAS No. 069011-17-2) | |
| | Total Exchange Capacity | 0.5 meq/ml[1] |
| | Moisture | 45–55% |
| | Shrink/Swell | >5% |
| | Density | 1.04 g/cc |
| | Standard Screen Size | 20–50; |
| | Max. Operating temperature in water | 60° C. |
| | Typical Surface Area ($m^2/g$) | 800 |
| | Mean Pore Size, (Angstroms) | 25 |
| Resin 3 | XU-43555.0, available from Dow Chemical Co., Midland, MI, Divinylbenzene, ethylvinylbenzene copolymer (CAS No. 009043-77-0) | |
| | Specific Surface Area $m^2/g$ | 800 (minimum) |
| | Avg. Pore Radius, Å | >75 |
| | Porosity, % | >55% |
| | Total Pore Volume, ml/g Particle Size | 1.75 (minimum) |
| | | 500 ± 50 microns |
| | less than 450 | <5% |
| | more than 550 | <5% |
| Resin 4 | XUS-40323.00, available from Dow Chemical Co., Midland, MI, Divinylbenzene, ethylvinylbenzene copolymer (CAS No. 009043-77-0) | |
| | Matrix Structure | Macroporous styrenic polymer |
| | Physical Form | White spheres |
| | Mesh Size | 16–50 |
| | Surface Area, $m^2/g$ | 650 |
| | Mean Pore Diameter, Å | 100 |
| | % Porosity (minimum) | 55 |
| Resin 5 | XUS-40283.00 available from Dow Chemical Co., Midland MI, Dimethylamine functionalized chloromethylated copolymer of styrene and divinylbenzene (CAS No. 069011-17-1) | |
| | Type | Weak base anion |
| | Form | Free base |
| | Structure | Macroporous styrene/DVB |
| | Total Capacity | 1.55 meq/ml min |
| | Weak Base Capacity | 1.35 meq/ml min |
| | Water Retention Capacity | 40–50% |
| | Expansion (%) | about 20% |

[1] milliequivalents per milliliter

After contacting individual samples of CHARSOL SUPREME with a Resin 1 through Resin 5 for one hour, the CHARSOL SUPREME was tested for benzo(a)pyrene content by the above-described HPLC method. The results are summarized in Table II.

TABLE II

| Resin | Benzo(a)pyrene (in ppb) |
| --- | --- |
| Treated Control | 3.1 |
| Resin 1 | 1.3 |
| Resin 2 | 0.45 |
| Resin 3 | <0.2 |
| Resin 4 | <0.2 |
| Resin 5 | 1.4 |

[1]The lower detectable limit for benzo(a)pyrene is 0.2 ppb. Resins 3 and 4 reduced the benzo(a)pyrene content to less than 0.2 ppb.

As illustrated in Table II, Resins 2 through 4 reduced the benzo(a)pyrene content to less than 1 ppb. Resins 2–4 are nonionic, hydrocarbon-based resins. Resins 3 and 4, which are divinylbenzene ethylvinylbenzene copolymers of high porosity and high surface area, are particularly effective in removing hydrocarbons from a liquid smoke composition. Resins 3 and 4 are nonpolar resins and are hydrophobic. Resin 2 is functionalized with dimethylamine and is a nonionic resin, but has a greater polarity than Resins 3 and 4 (i.e., is of intermediate polarity). Resin 2 is less hydrophobic than Resins 3 and 4.

Resins 1 and 5 are in the ionic form and are not as effective in removing hydrocarbons from a liquid smoke composition. Resins 1 and 5 reduced the benzo(a)pyrene content by only about 55% to 60%, whereas Resins 2–4 reduced benzo(a)pyrene content by about 85% (Resin 2), and by greater than 93% (Resins 3 and 4). Ionic resins typically remove ionic species from a solution. Therefore, ionic resins also would remove an unacceptably high amount of neutralized phenolics and other ionic coloring and flavoring materials from the alkaline tar solution.

P. Simko et al., *Potravinarske Vedy*, 12(3), (1994), pages 175–184, discloses that polynuclear aromatic hydrocarbons, including benzo(a)pyrene, in liquid smoke compositions are absorbed by polyethylene packaging after a one-week storage period. However, P. Simko et al. failed to consider or address whether an aliphatic hydrocarbon-based polymer also removes the desirable components, like phenolics, from a liquid smoke composition.

To determine the ability of an aliphatic hydrocarbon-based resin to remove hydrocarbons from a liquid smoke composition, the following experiments were performed. Polyethylene and polypropylene beads were obtained from Aldrich Chemical Co., Milwaukee, Wis. The polyethylene beads were high density beads having a weight average molecular weight of about 125,000. The polypropylene beads comprised isotactic polypropylene having a weight average molecular weight of about 250,000.

In separate tests, the polyethylene beads or polypropylene beads were placed in a 50 ml column, then a liquid smoke solution (500 ml) was passed through each column at a rate of about 5 ml/minute. The liquid smoke sample was a 30–35 brix CHARSOL C-10 product, available from Red Arrow Products Co., Manitowoc, Wis.

The liquid smoke composition passed over the polyethylene beads had an initial benzo(a)pyrene concentration of 3.4 ppb. After passing through the column of polyethylene beads, the liquid smoke composition had a benzo(a)pyrene concentration of 3.3 ppb. The aliphatic ethylene-based resin, therefore, removed an insignificant 3% of the carcinogenic benzo(a)pyrene from the liquid smoke composition.

The liquid smoke composition passed over the polypropylene beads had an initial benzo(a)pyrene concentration of 2.0 ppb. After passing through the column of polypropylene beads, the liquid smoke composition had a benzo(a)pyrene concentration of 1.8 ppb. The aliphatic propylene-based resin, therefore, removed in insubstantial 10% of the carcinogenic benzo(a)pyrene from the liquid smoke composition.

The above tests illustrate that useful nonionic hydrocarbon resins are based on an aromatic compound, like styrene or divinylbenzene. The aromatic hydrocarbon-based resin effectively remove the benzo(a)pyrene from liquid smoke compositions, and, as demonstrated hereafter, from alkaline tar solutions. The aliphatic hydrocarbon-based resins failed to remove sufficient amounts of compounds such as benzo(a)pyrene from a liquid smoke compound when the liquid smoke composition is passed through a column. Accordingly, the aliphatic hydrocarbon-based resins either are incapable of effectively removing hydrocarbons from a liquid smoke composition, or require abnormally long contact times that would make the use of an aliphatic hydrocarbon-based resin economically impractical.

As previously stated, liquid smoke compositions are complex mixtures containing a variety of classes of compounds. Many of the constituents are necessary to impart color and flavor to treated foodstuffs. Therefore, it is important that the essential smoke and flavoring constituents of the liquid smoke composition, like phenolics, are not removed with the hydrocarbons. It also is important that these coloring and flavoring constituents are not removed from tar solutions.

The samples of CHARSOL SUPREME treated by Resins 1 through 5, and an untreated sample, also were analyzed by gas chromatography for the essential smoke and flavoring constituents. The quantitative determination of smoke and flavoring constituents were performed by comparing gas chromatographic peak integrations of a sample with peak integrations of a standard curve generated from a 1% to 5% serial dilution of the smoke and flavoring components in water. Gas chromatograms were run on a Varian Gas Chromatograph Model 3300 equipped with a Varian Integrator Model 4290, fitted with a fused silica capillary column (either a 0.25 mm×60 m J&W DB 1701 column or a 0.25 mm×30 m J&W DB Wax column), and using hydrogen carrier gas at a flow rate of 2.0 ml/mm and a temperature program of 40° C. initial temperature, zero minute hold followed by increasing the temperature at 10° C./minute to 220° C. The injector temperature was 220° C., the detector temperature was 240° C.

The gas chromatograph analysis showed the CHARSOL SUPREME treated with Resins 1, 2, and 5 had substantial amounts of the phenolics removed from the liquid smoke composition. The loss of phenolics was sufficient to adversely affect the ability of CHARSOL SUPREME to flavor a foodstuff. CHARSOL SUPREME treated with Resins 3 and 4 showed a slight decrease in phenolic content, but not a sufficient decrease to adversely affect the ability of CHARSOL SUPREME to flavor a foodstuff, i.e., less than a 20% decrease in phenolic content. The CHARSOL SUPREME samples treated with Resins 3 and 4 contained at least about 85% by weight of the total phenolics present in the untreated sample of CHARSOL SUPREME.

The ability of Resins 3 and 4 to remove hydrocarbons, and particularly polynuclear aromatic compounds, from CHARSOL SUPREME also was tested by the above-described method by mixing 10 volume parts of CHARSOL SUPREME (e.g., 50 ml) with 1 weight part of resin (e.g., 5 g). The benzo(a)pyrene content of each resin-treated CHARSOL SUPREME sample was about 0.2 ppb, i.e., about 93.5% reduction in hydrocarbons. At a 10:1 v/w ratio of liquid smoke composition to resin, the amount of phenolics removed from the liquid smoke composition was less than the amount of phenolic removed in the resin treatment using a 5:1 v/w ratio of liquid smoke composition to resin.

Resin 3 again was tested by the above-described method using a 20:1 v/w ratio of CHARSOL SUPREME (e.g., 100 ml) to resin (e.g., 5 g). A complete analysis of untreated CHARSOL SUPREME and CHARSOL SUPREME treated by Resin 3 in this test is summarized in Table III.

Another liquid smoke composition, CHARSOL C-10, available commercially from Red Arrow Products, Co., Inc., Manitowoc, Wis., was treated with Resin 3 by the above-described method. CHARSOL C-10 contains a lower percentage of smoke and flavoring constituents than CHARSOL SUPREME. In these tests, freshly-produced, unfiltered CHARSOL C-10 was treated with Resin 3. The CHARSOL C-10 was mixed with the resin at rates of 20:1, 30:1, and 40:1 volume of liquid smoke to weight of resin. Test results are summarized in Table IV.

TABLE III

| Sample | Acid[2] (%) | Phenolics[3] (mg/ml) | Carbonyls[4] (mg/ml) | Browning[5] Index | pH | B(a)p[1] (ppb) |
|---|---|---|---|---|---|---|
| CHARSOL SUPREME | 13.2 | 25.1 | 24.3 | 19.7 | 2.28 | 3.1 |
| Treated CHARSOL SUPREME (20:1 v/w) | 13.2 | 22.0 | 22.9 | 18.9 | 2.23 | 0.59 |

[1]benzo(a)pyrene
[2]determination of total acidity as acetic acid by potentiometric titration, 2 ml sample was titrated with 0.1 N sodium hydroxide (NaOH) to pH 7, using a pH meter, $$\% \text{ acid as acetic acid} = \frac{(ml\ NaOH)\ (normality\ NaOH)\ (.001)\ (60)\ (100)}{ml\ sample},$$

wherein .001 = conversion factor liter to ml
60 = molecular weight of acetic acid
100 = conversion factor to percent
[3]procedure for determining phenolics is a modified Gibbs method which measures phenolics as 2,6-dimethoxyphenol and is described in Tucker, I. W. "Estimation of Phenols in Meat and Fact," JAOAC, XXV, 779 (1942) and in U.S. Pat. No. 4,994,297, hereby incorporated by reference.
[4]procedure for determining carbonyls is a modified Lappan-Clark method which measures carbonyls as 2-butanone and is described in "Colorimetric Method for Determination of Traces of Carbonyl Compounds," Anal. Chem. 23, 541-542 (1959), and in U.S. Pat. No. 4,994,297, hereby incorporated by reference.
[5]Browning Index is the quantity of potential color-forming substances present per unit of liquid smoke or flavoring composition. The browning index is a relative measure of the ability of carbonyls to react with the amino acid, glycine. Tests have shown good correlation between the browning index values of a liquid smoke composition and the extent of brown color formation on meat surfaces. The determination of browning index is set forth in U.S. Pat. No. 4,994,297, hereby incorporated by reference.

The data summarized in Table III show that contact with a nonionic, aromatic hydrocarbon-based resin reduces the

TABLE IV

| Sample | Acid (%)[2] | Phenolics (mg/ml)[3] | Browning Index[5] | Carbonyls (mg/ml)[4] | B(a)P (ppb)[1] |
|---|---|---|---|---|---|
| Untreated CHARSOL C-10 | 11.5 | 13.6 | 11.5 | 14.7 | 5.6 |
| CHARSOL C-10 (20:1)[6] | N/A | N/A | N/A | N/A | 0.3 |
| CHARSOL C-10 (30:1) | 11.2 | 12.2 | 11.0 | 14.7 | 0.5 |
| CHARSOL C-10 (40:1) | 11.2 | 12.0 | 10.7 | 14.7 | 0.7 |

[6]ratio of milliliters of CHARSOL C-10 added to grams of Resin 4.

benzo(a)pyrene content from 3.1 to 0.59 ppb, i.e., a greater than 80% decrease, and reduces phenolic content by only about 12% compared to untreated CHARSOL SUPREME. Treating CHARSOL SUPREME with a nonionic, aromatic hydrocarbon-based resin, therefore, effectively removed the polynuclear aromatic compounds, without adversely affecting the phenolic content of the liquid smoke and flavoring composition.

The nonionic resins have a further reduced ability to remove phenolics from an alkaline tar solution because the phenolics are present in an anionic form. The ionic form of compounds typically are not effectively removed from solutions by a nonionic resin.

The data summarized in Table IV show a decrease in benzo(a)pyrene of about 87.5% to about 94.5%, to a level substantially below 1 ppb. The data in Table IV also show a reduction in phenolics of only about 10% to about 11.75%, thereby providing a treated liquid smoke composition having a substantially reduced hydrocarbon content and a sufficient phenolic content to impart flavor to treated foodstuffs.

In accordance with an important feature of the present invention, it was observed that as the v/w ratio of liquid smoke composition to resin increased, i.e., as the v/w ratio increased from about 5:1 to about 50:1, the amount of phenolics removed from the liquid smoke decreased. Accordingly, to maximize the amount of hydrocarbons removed from the liquid smoke composition, while minimizing removal of phenolics, the v/w ratio of liquid smoke composition to resin is about 5 to about 50 to 1, and preferably about 10 to about 40 to 1. To achieve the full advantage of the present invention, then v/w ratio of liquid smoke composition to resin to about 15 to about 25 to 1.

Another test was performed to determine a sufficient time for the nonionic resin to contact the liquid smoke composition to effectively remove hydrocarbons, like polynuclear aromatic compounds. In this test, seven individual beakers containing a v/w ratio of CHARSOL C-10 to Resin 4 40:1 of were prepared. The contents in six of the beakers was stirred, and every 10 minutes stirring of one beaker was stopped. All stirring, therefore, was completed in 60 minutes. For each beaker, as soon as stirring was stopped, the contents were filtered, then tested for phenolics and benzo (a)pyrene. The seventh beaker was a control, which was filtered essentially immediately after the CHARSOL C-10 and Resin 4 were added to the beaker, i.e., an elapsed time of 0 minutes. The test results are summarized in Table V.

TABLE V

| Time (min) | Phenolics (mg/ml) | B(a)P (in ppb) | % B(a)P Reduction |
|---|---|---|---|
| 0 | 13.6 | 8.3 | — |
| 10 | 13.6 | 3.9 | 53 |
| 20 | 13.6 | 2.6 | 69 |
| 30 | 12.5 | 2.1 | 75 |
| 40 | 12.8 | 1.7 | 80 |
| 50 | 13.1 | 1.3 | 84 |
| 60 | 12.0 | 0.9 | 89 |

The data summarized in Table V show that a contact time of at least 10 minutes, and preferably at least 20 minutes, substantially reduces the benzo(a)pyrene content. In addition, a contact time of 60 minutes did not adversely affect the phenolic content of the CHARSOL C-10.

Table V illustrates that a 30 to 40 minute contact time was necessary to reduce the hydrocarbon content by about 80%. However, it also was found that for different v/w ratios of CHARSOL C-10 to Resin 4, e.g., 10:1 or 20:1, the contact time to remove at least 80% of hydrocarbons can be as low as 10 minutes. In addition, liquid smoke compositions having a low concentration of organic compounds, and treated at a high v/w ratio of liquid smoke composition to resin, can require a contact time of up to about 120 minutes. Accordingly, the contact time varies from about 10 to about 120 minutes, and the specific contact time is related to the concentration of organic compounds in the liquid smoke composition and the v/w ratio of liquid smoke composition to resin used in the method.

Accordingly, to effectively remove hydrocarbons from a liquid smoke composition without adversely affecting phenolic content, the contact time between the liquid smoke composition and nonionic, aromatic hydrocarbon-based resin is about 10 to about 120 minutes, and preferably 20 to about 90 minutes. To achieve the full advantage of the present invention, the contact time is about 30 to about 60 minutes.

An addition to the above-described batch process for removing polynuclear aromatic compounds from a liquid smoke composition, a continuous process also can be practiced. In the continuous process, the liquid smoke composition is fed through a column packed with a nonionic, aromatic hydrocarbon-based resin. To provide sufficient contact time between the liquid smoke composition and the resin to effectively remove hydrocarbons, the liquid smoke composition is passed through the resin bed in the column at a rate of about 0.1 to about 2 bed volumes per hour.

To demonstrate the continuous process, a 2 centimeter (cm) inner diameter (I.D.) glass tube (30 cm in length) was fitted with a valve at the bottom of the tube to regulate flow. Glass wool was packed into the bottom of the tube as a barrier to contain the resin in the column. A separatory funnel was fitted with a stopper was positioned at the top of the column to regulate flow of liquid smoke composition entering the column, and thereby maintain a constant liquid level. Resin 3 (23 g) was packed into the column. This amount of Resin 3 (about 25 cc) filled 11 cm of the column. This amount of Resin 3 permits processing of 460 ml of CHARSOL SUPREME or 920 ml of CHARSOL C-10 at predetermined v/w ratios. The flow through the column was adjusted such that the CHARSOL SUPREME flowed through in about 40 to about 50 minutes, and the CHARSOL C-10 flowed through in about 85 to about 95 minutes.

Tests performed with CHARSOL SUPREME and CHARSOL C-10, passed through a column at a v/w ratio of about 10 to about 40 to 1, effectively removed benzo(a)pyrene from the liquid smoke composition, without adversely affecting phenolic content.

To enhance the economic feasibility of the method of the present invention, the resin preferably is capable of being rinsed free of hydrocarbons, and thereby be regenerated for reuse. To illustrate that the aromatic hydrocarbon-based resins utilized in the present method can be regenerated, the columns packed with Resin 3 in the above-described continuous process were subjected to cleaning cycles. Attempts to regenerate the columns using aqueous sodium hydroxide were not effective, and an attempt using concentrated sulfuric destroyed the resin.

However, it was found that a simple washing of the resin with methanol stripped the resin of hydrocarbons and other retained compounds, and returned the resin to its original color and capacity. Residual amounts of methanol in the column after methanol washing are removed by washing the column with water. Other polar solvents that are soluble in water, and preferably having a lower boiling point than water, also can be used to wash and regenerate the resin. Nonlimiting examples are ethanol, isopropyl alcohol, methyl ethyl ketone, and acetone.

To illustrate that commercial quantities of liquid smoke composition can be treated with a nonionic, aromatic hydrocarbon-based resin to remove hydrocarbons, a large column of a suitable resin was prepared. The column was 10 inches in diameter and 6 feet high, and packed with two cubic feet of Resin 3. After preparing the column, the resin first was washed with water. In this test, CHARSOL C-10 then was gravity fed from a holding tank containing freshly prepared CHARSOL C-10 into the column. The feed of CHARSOL C-10 was regulated with a small ball valve to provide a rate of about ⅓ of a gallon of CHARSOL C-10 per minute through the column. The treated liquid smoke composition exiting the column was collected in a small portable tank and later pumped into a larger holding tank. The column was fed for about 25½ hours, during which time 509 gallons of CHARSOL C-10 were treated. This calculates to a v/w ratio of 35 volume parts liquid smoke composition to 1 weight part resin, with a contact time between liquid smoke composition and resin of about 45 minutes. Results of the test are summarized below in Table VI.

TABLE VI

| Sample | Phenolics (mg/ml) | B(a)P (ppb) |
| --- | --- | --- |
| Untreated CHARSOL C-10 | 11.7 | 0.6 |
| Treated CHARSOL C-10 | 11.7 | None detected[7] |

[7]detectable limit is 0.2 ppb, therefore, treated CHARSOL C-10 contains less than 0.2 ppb B(a)P.

The continuous method effectively reduced the benzo(a) pyrene content of CHARSOL C-10 to below the detectable limit of 0.2 ppb, and had no effect on the phenolic content of CHARSOL C-10. The present method, therefore, is effective in further reducing the benzo(a)pyrene content of liquid smoke compositions having an initial concentration of benzo(a)pyrene about 1 ppb or less, such as a liquid smoke composition made by a fast pyrolysis process.

Other resins were tested for an ability to remove hydrocarbons, and especially polynuclear aromatic hydrocarbons, from liquid smoke compositions. The resins are marketed under the tradename AMBERLITE, and are available commercially from Rohm and Haas Co., Philadelphia, Pa. One particular AMBERLITE resin is XAD-16, identified as follows:

| | |
| --- | --- |
| Matrix | Macroreticular crosslinked aromatic polymer |
| Appearance | White translucent beads |
| Particle Size | 0.3 to 1.2 mm (millimeters) |
| True Wet Density | 1.01 g/ml |
| Surface Area | 800 m²/g (minimum) |
| Porosity | 55% (vol/vol) (minimum) |
| Pore Size Range | 2 to 300Å |

The XAD-16 resin was used to treat CHARSOL C-10 in the continuous process method described above. The XAD-16 resin was used at a v/w ratio of liquid smoke composition to resin of about 40 to 1. Three samples of CHARSOL C-10 were tested. The first sample was treated with virgin XAD-16. The second sample was treated with XAD-16 rinsed one time with methanol. The third sample was treated with XAD-16 rinsed two times with methanol. Results of the tests are summarized below in Table VII.

TABLE VII

| Sample | Acids (%) | Phenolics (mg/ml) | Carbonyls (mg/ml) | Browning | B(a)P (ppb) |
| --- | --- | --- | --- | --- | --- |
| Untreated Control C-10 | 10.9 | 17.0 | 15.0 | 12.2 | 5.6 |
| C-10 Treated With Virgin XAD-16 Resin | 10.7 | 16.7 | 14.7 | 11.0 | 1.1 |
| C-10 Treated With XAD-16 Washed One Time With Methanol | 10.9 | 15.6 | 12.9 | 11.6 | 0.9 |
| C-10 Treated With XAD-16 Washed Two Times With Methanol | 10.7 | 14.7 | 14.9 | 12.0 | 1.2 |

The data summarized in Table VII show that XAD-16 effectively removed polynuclear aromatic compounds from CHARSOL C-10. The amount of benzo(a)pyrene was reduced by about 79% to about 83% compared to the untreated CHARSOL C-10. The XAD-16 resin also removed only about 2% to about 15% of the phenolics present in untreated CHARSOL C-10. The XAD-16 resin, therefore, did not remove sufficient phenolics from the CHARSOL C-10 to adversely affect the liquid smoke composition.

Other AMBERLITE resins, in addition to XAD-16, were tested for an ability to remove benzo(a)pyrene from a concentrated solution of CHARSOL C-10. Conventionally, CHARSOL C-10 is about 25 brix. Concentrated CHARSOL C-10 is abut 33 brix. In each test, 1000 ml of 33 brix CHARSOL C-10 was fed through a column containing 25 g of an AMBERLITE resin (i.e., a 40 to 1 v/w ratio), at a flow rate of about 10 ml per minute.

The tested AMBERLITE resins were XAD-2, XAD-4, XAD-7, XAD-8, and XAD-16. AMBERLITE XAD-2, XAD-4, and XAD-16 are crosslinked aromatic polymers and are nonpolar. AMBERLITE XAD-7 and XAD-8 are acrylic ester-based polymers and are of intermediate polarity. As illustrated below, the nonpolar resins are preferred because of an enhanced ability to remove benzo(a)pyrene from a liquid smoke composition. Test results are summarized in Table VIII.

TABLE VIII

| Resin | Phenolics (mg/ml) | B(a)P (ppb) |
| --- | --- | --- |
| Control (no treatment) | 19.4 | 7.3 |
| XAD-2 | 17.9 | 0.4 |
| XAD-4 | 17.4 | 0.3 |
| XAD-7 | 18.2 | 1.2 |
| XAD-8 | 18.1 | 1.5 |
| XAD-16 | 17.8 | 0.4 |

Table VIII illustrates that the nonpolar aromatic resins outperform the acrylic ester-based resins of intermediate polarity with respect to removing benzo(a)pyrene from 33° brix CHARSOL C-10. The nonpolar aromatic resins removed about 94% to about 96% of the hydrocarbons from the CHARSOL C-10. The acrylic ester-based resins removed about 80% to about 83.5% of the hydrocarbons.

Furthermore, the amount of phenolics present in 33 brix CHARSOL C-10 were not adversely affected by either type of resin. However, the resins of intermediate polarity are known to reduce the phenolic content in liquid smoke compositions of lower concentration than 33 brix. In a 33 brix composition, the organic content is high and the phenolics have tendency to remain in solution during resin treatment. As the brix of the liquid smoke composition is lowered, phenolic solubility is decreased and the phenolics are more easily removed by the acrylate ester-type resins. However, both types of resins effectively remove the benzo (a)pyrene from concentrated liquid smoke compositions.

Resins 6-8 also were tested for an ability to remove benzo(a)pyrene from a liquid smoke and flavoring composition. Resins 6-8 are available from Dow Chemical Co., Midland, Mich. In particular, Resin 6 is Dow XYS-40032, which is a strong cation exchange resin functionalized with active sulfonate groups on a macro-porous styrene-divinylbenzene matrix. Resins 7 and 8 are Dow XU-43520 and XU-43555, respectively. Resins 7 and 8 are polymeric absorbent resins.

In tests using Resins 7 and 8, concentrated 33 brix CHARSOL C-10 (1000 ml) was fed through 25 g (i.e., a 40 to 1 v/w ratio) of the resin at a flow rate of 10 ml/minute. In tests using Resin 6, 500 ml of 33 brix CHARSOL C-10 was fed through 25 g of Resin 6 because preliminary experiments showed that Resin 6 has a lower capacity to remove benzo(a)pyrene than Resins 7 and 8. The results of tests using Resins 6–8 are summarized below in Table IX.

TABLE IX

| Resin | Phenolics (mg/ml) | B(a)P (ppb) |
|---|---|---|
| Control (no treatment) | 18.5 | 4.5 |
| Resin 6 | 18.2 | 2.9 |
| Resin 7 | 16.8 | 0.1 |
| Resin 8 | 17.4 | 0.4 |

The data summarized in Table IX shows that the cationic Resin 6 did not effectively remove benzo(a)pyrene from 33 brix CHARSOL C-10 (i.e., about 35% removed). In contrast, nonionic Resins 7 and 8 removed about 98% and about 91%, respectively, of the benzo(a)pyrene from 33 brix CHARSOL C-10, without adversely affecting the amount of phenolic in the 33 brix CHARSOL C-10 (i.e., about 9% and about 6% reduction in phenolics for Resins 7 and 8, respectively).

In another experiment, Resin 3 was used to treat a commercial liquid smoke designated as SMK 5991, available from Hickory Specialties Inc., Brentwood, Tenn. SMK 5991 was mixed with Resin 3 at a 40:1 v/w ratio of liquid smoke composition to resin. Three SMK 5991 samples were tested. One sample was fed through virgin Resin 3. Second and third samples were fed through Resin 3 washed once and twice with methanol, respectively. Results are summarized in Table X.

TABLE X

| | Acids (v/w) | Phenolics (mg/ml) | Carbonyls (mg/ml) | Browning Index | B(a)P (ppb) |
|---|---|---|---|---|---|
| Control | 11.3 | 18.4 | 17.9 | 13.5 | 3.6 |
| Virgin Resin 3 | 11.0 | 17.4 | 17.5 | 13.5 | 0.8 |
| Resin 3 Washed Once With Methanol | 11.0 | 16.0 | 18.3 | 13.8 | 0.47 |
| Resin 3 Washed Twice With Methanol | 11.0 | 16.7 | 16.4 | 13.1 | 0.37 |

The data in Table X show that Resin 3 effectively removes benzo(a)pyrene from different liquid smoke compositions (i.e., about 70% to about 90% reduction of hydrocarbons), without adversely affecting the concentration of phenolics (i.e., about 5.5% to about 13% reduction of phenolics) in the liquid smoke composition.

A nonionic, aromatic hydrocarbon-based resin also can be used to reduce the concentration of hydrocarbons in an aqueous alkaline solution containing the water-soluble components of a pyrolysis tar, i.e., a tar solution. The resin reduces the concentration of benzo(a)pyrene in the tar solution to about 10 ppb or less. As previously stated, the pyrolysis of wood yields an intractable, water-insoluble tar that, until the present invention, possessed no commercial value. The tar, which contains a high concentration of total hydrocarbons (e.g., typically measured as benzo(a)pyrene in excess of about 1000 ppb, and measured up to about 3000 ppb), previously has been discarded.

It has been found that, after the water-insoluble tar has been isolated from the liquid smoke composition, the tar can be solubilized in an aqueous alkali to form a tar solution. The tar solution then is contacted with a sufficient amount of a nonionic, aromatic hydrocarbon-based resin for a sufficient time to provide a smoke coloring and flavoring composition containing about 10 ppb or less benzo(a)pyrene.

In one embodiment, the tar solution as prepared is a single aqueous phase, and the entire tar solution is contacted with the nonionic resin. In another embodiment, after solubilizing the tar in the aqueous alkali, the resulting mixture separates into an aqueous phase and an organic phase. In this embodiment, the organic phase is discarded, and the aqueous phase, i.e., the tar solution, is contacted with the nonionic resin. The method of the present invention, therefore, substantially reduces the volume of discarded tar, reduces costs attendant to disposing of the tar, and provides an aqueous composition that imparts a smoke coloring and flavoring to foodstuffs.

In particular, a liquid smoke composition, such as CHARSOL C-10, generally is prepared by pyrolyzing wood, collecting the condensable pyrolysis products in water, and allowing the water-insoluble compounds, i.e., the tar, to separate from the liquid smoke composition. The tar then is isolated from the liquid smoke composition.

In contrast to present-day practice, rather than discarding the tar, the insoluble tar is solubilized in an aqueous alkali. Typically, about 1 part by volume of tar is solubilized in about 0.5 to about 4 parts by volume aqueous alkaline solution. Preferably, 1 part by volume tar is solubilized in about 0.5 to about 3 parts by volume aqueous alkali. To achieve the full advantage of the present invention, 1 part by volume tar is solubilized in about 0.5 to about 2 parts by volume aqueous alkali.

The aqueous alkali comprises about 5% to about 50% by weight of an alkali in water. Examples of alkalis include, but are not limited to, sodium hydroxide, ammonium hydroxide, potassium hydroxide, sodium carbonate, sodium bicarbonate, trisodium phosphate, disodium phosphate, and mixtures thereof. The aqueous alkali preferably contains about 10% to about 40% by weight of an alkali, and to achieve the full advantage of the present invention, about 10% to about 25% by weight of an alkali.

The solution containing the tar and aqueous alkali has a pH of about 10 to about 13, and preferably about 10.5 to about 13. To achieve the full advantage of the present invention, the tar solution has a pH of about 10.5 to about 12. The pH is easily measured by methods well known in the art, and is determined by the identity of the alkali, the concentration of the aqueous alkali and the ratio of tar to aqueous alkali in the solution.

The tar is solubilized in the aqueous alkali by adding the tar to the aqueous alkali, with agitation, to provide a homogeneous mixture of the tar in the aqueous alkali. The alkali neutralizes and solubilizes various components of the tar, such as the phenolics and polymeric pyrolysis products. Other tar components, e.g., hydrocarbons, are unaffected by the alkali and are not solubilized by the alkali. However, the hydrocarbons nevertheless are solubilized in the tar solution because the tar solution contains a high concentration of organic compounds. A high organic compound concentration solubilizes compounds, like hydrocarbons, that otherwise are insoluble in water.

After the tar mixture is formed, agitation is stopped. In some embodiments, an organic phase separates from an aqueous phase. The organic phase is isolated from the aqueous phase, then discarded. The retained aqueous phase is the tar solution.

In a preferred embodiment, the tar mixture is allowed to stand for a sufficient time for the organic phase, if any, to separate from the aqueous phase, i.e., the tar solution. The tar mixture is allowed to stand for at least about 1 hour, and typically up to about 72 hours, to allow separation of the organic phase. Removal of the organic phase is preferred because hydrocarbons concentrate in the organic phase, thereby reducing the initial concentration of hydrocarbons in the tar solution. In an alternative method, the organic phase and aqueous phase of the tar mixture can be separated by mechanical means, such as centrifugation.

The tar solution is dark in color and contains solubilized tar components, including hydrocarbons and neutralized phenolics. The tar solution contains a high concentration (i.e., greater than 50 ppb, and often greater than 200 ppb) of benzo(a)pyrene. Similar to liquid smoke compositions, the hydrocarbons are suspended or dissolved in the tar solution by the organic compounds and organic salts present in the solution.

The tar solution cannot be applied to a foodstuff in its present form because the concentration of benzo(a)pyrene is in excess of 50 ppb. The tar solution, therefore, is contacted for a sufficient time with a sufficient amount of a nonionic, aromatic hydrocarbon-based resin to reduce the benzo(a) pyrene to about 10 ppb or less, i.e., remove at least about 80% of hydrocarbons from the tar solution. Typically, the hydrocarbon content of the tar composition is reduced by at least about 90%, and often up to about 99.5%, to provide a smoke coloring and flavoring composition having less than 1 ppm, and preferably less than 0.5 ppb, benzo(a)pyrene.

The resulting smoke coloring and flavoring composition is a dark liquid that imparts a smoke coloring and flavoring to a foodstuff. The smoke coloring and flavoring composition is applied to the surface of a foodstuff and acts like a dye to impart a smoke color to a foodstuff, and, unlike a liquid smoke composition, does not require heating to initiate a Maillard reaction to brown the foodstuff. Foodstuffs colored by the smoke coloring and flavoring composition include, but are not limited to, meat, such as beef, pork, or lamb, fish, poultry, cheese, encased food products, like sausage, and casings for food products, including fibrous and nonfibrous casings, like cellulosic or collagen casings.

Smith et al. U.S. Pat. No. 4,446,167 discloses the addition of an alkali to a liquid smoke composition to provide a high pH smoke coloring composition. However, Smith et al. teaches addition of an alkali to a liquid smoke composition, as opposed to the water-insoluble tar by-product formed in the manufacture of a liquid smoke composition. The high pH compositions disclosed by Smith et al. apparently contain the same hydrocarbon concentration as the starting liquid smoke composition.

To demonstrate the manufacture of a smoke coloring and flavoring composition of the present invention, 200 volume parts of a tar by-product produced in the manufacture of CHARSOL C-10 is solubilized in 150 volume parts of a 25% by weight aqueous solution of sodium hydroxide. The solution is prepared by adding the tar to the sodium hydroxide solution, with agitation, and by continuing agitation until the solution is homogeneous. Then, an additional 100 volume parts of water is added to the solution. The final tar solution contains 200 volume parts tar and 250 volume parts of 15% by weight aqueous sodium hydroxide. The tar solution has a pH of about 12, and is very dark in color.

After the tar is completely solubilized in the aqueous sodium hydroxide, agitation is stopped. The solution is allowed to stand for about 8 hours and an organic phase separates from an aqueous phase. The organic phase is isolated and discarded. The aqueous phase is the tar solution.

The tar solution (150 ml), containing about 70 ppb benzo(a)pyrene is passed through a column containing 5 g of above-described Resin 4. The resulting smoke coloring and flavoring composition is assayed for benzo(a)pyrene by the method described above, and found to contain less than 10 ppb benzo(a)pyrene. The smoke coloring and flavoring composition is a very dark solution and is applied as a coating to cellulosic casing. The coated casing has a good smoke color.

In another test, the coloring ability of various smoke coloring and flavoring compositions at different pH values were investigated. In this experiment, a 50 ml sample of a tar obtained from the manufacture of CHARSOL C-10 was added to a mixture of 100 ml of a 50% by weight aqueous sodium hydroxide solution and 200 ml of water, i.e., 300 ml of a 16.7% aqueous sodium hydroxide solution. The resulting mixture was agitated to provide a homogeneous solution having a pH of about 13.4. An additional 100 ml of tar was admixed into the homogeneous solution, and the pH was reduced to 13.2. The tar contains about 25% by weight phenolics, and, therefore, is acidic and causes a pH reduction. After solubilizing a second 100 ml of tar in the tar solution, the pH remained at 13.2. A color analysis performed on this tar solution yielded a color value of 455.5.

The color analysis was performed by determining the weight of 1 ml of the tar solution using a volumetric pipette, and introducing the 1 ml tar solution sample into a 100 ml volumetric flask. The volumetric flask was filled to volume with a 50% distilled water/50% methanol (v/v) solution. The contents of the flask were mixed until homogeneous, then 10 ml of the diluted tar solution was pipetted into a second 100 ml volumetric flask. This flask then was filled to volume with the 50/50 water/methanol solution. The absorbance of the twice-diluted tar solution was determined on a Spectronic 601 spectrometer operating in the absorbance mode at 490 nm (nanometers) and using a 1 cm cuvette. Color is calculated from the following formula:

$$\text{Color} = \frac{\text{Absorbance reading} \times 1000}{\text{weight of 1 ml of tar solution}}$$

A color value of at least 200 provides an acceptable smoke coloring and flavoring composition. A composition having a color value of at least 300 is considered an excellent coloring and flavoring composition for a foodstuff. Preferably, a smoke coloring and flavoring composition of the present invention has a color value of about 200 to about 1500.

After determining the color value, an additional amount of tar (200 ml) was added to the above tar solution. The pH of the resulting solution dropped to 11.6, however, the tar solution was too viscous to perform a color analysis. Therefore, an additional 100 ml of tar was added to the solution and the pH decreased to 11. The resulting tar solution was allowed to stand overnight, and an organic phase separated from the aqueous phase of the solution. A color analysis was performed on the aqueous phase (i.e., the tar solution), and provided a color value of 286.1.

After adding an additional 100 ml of water to the tar solution having a color value of 286.1, the pH of the resulting tar solution was 10.7. Addition of yet an additional 100 ml of tar to the tar solution provided a solution having a pH of 10.3. The tar solution of pH 10.3 quickly separated into an organic phase and an aqueous phase. A color analysis performed on the aqueous phase (i.e., the tar solution) provided a color value of 273.4. The coloring ability of these tar solutions are summarized in Table XI.

TABLE XI

| Sample | Color | % Water | % Tar | % NaOH[2] |
| --- | --- | --- | --- | --- |
| pH 13.2 | 455.5 | 45 | 45 | 10 |
| pH 11.6 | N/D[1] | 33.5 | 60 | 6.5 |
| pH 11.0 | 286.1 | 36.5 | 58 | 5.5 (phase sep.) |
| pH 10.3 | 273.4 | 38.6 | 57 | 4.4 (phase sep.) |

[1]N.D. = not determined because of high viscosity of the solution; and
[2]sodium hydroxide.

The data summarized in Table XI shows that a tar solution has a sufficient coloring ability to impart a smoke color to a foodstuff because each tar solution illustrated in Table XI had a color value greater than about 200. Each tar solution also is a true solution because dilution with water provided a dark, but clear liquid.

The tar solutions summarized in Table XI have the ability to impart color and flavor to a foodstuff by simply applying a tar solution to a surface of the foodstuff. The dark tar solutions impart a smoke color by providing a dark coating on the foodstuff. A smoke flavor is provided by the high concentration of phenolic compounds present in tar, and accordingly in the tar solution.

However, the tar solutions illustrated in Table XI are unsuitable for application to a foodstuff because the tar solutions have a benzo(a)pyrene content in excess of 50 ppb, and often in excess of 200 ppb. The tar solutions, therefore, are contacted with a nonionic, aromatic hydrocarbon-based resin, as described above to reduce the benzo(a)pyrene content to 10 ppb or less, and provide a commercially acceptable product. The tar solution is contacted with the nonpolar, hydrophobic resin in a ratio of about 5 to about 50 volume parts, in millimeters, of the tar solution to 1 weight part, in grams, of the resin.

To illustrate that a nonionic, aromatic hydrocarbon-based resin can selectively remove hydrocarbons from a tar solution the following experiment was performed. In this experiment, previously described Resin 7 was used to remove hydrocarbons from a tar solution. As illustrated previously, Resin 7 effectively removed about 98% of benzo(a)pyrene from a liquid smoke composition. The following example shows that Resin 7 also effectively removes benzo(a)pyrene from a tar solution.

In particular, 1000 ml of a wood tar was added to an agitated mixture containing 1000 ml of water and 1000 ml of 50% by weight aqueous sodium hydroxide. The wood tar was a by-product from the manufacture of CHARSOL C-10 and contained about 1000 ppb of benzo(a)pyrene. The resulting mixture contained about 33.3% by weight tar and about 66.7% by weight of 25% aqueous sodium hydroxide, and contained about 333 ppb benzo(a)pyrene. The resulting mixture was stirred for about 60 minutes to solubilize the tar in the aqueous alkali. The sodium hydroxide neutralizes various tar components, thereby rendering these components water soluble. These solubilized components then solubilize other tar components in water.

A first portion of the tar solution (1500 ml) was diluted with 1000 ml of water to reduce the viscosity of the solution. The resulting tar solution contain 20% by weight tar, and contained about 200 ppb benzo(a)pyrene. The resulting tar solution (2500 ml) was mixed with 60 g of Resin 7, and the mixture of tar solution and Resin 7 was stirred for about one hour. The resin then was filtered from the tar solution, and the tar solution was assayed for benzo(a)pyrene by the above-described method. The tar solution treated with Resin 7 contained about 19 ppb benzo(a)pyrene, indicating about 90.5% reduction in hydrocarbon content using a ratio of about 40 volume parts of tar solution to 1 weight part of resin, i.e., 2500 ml tar solution/60 g resin.

To further reduce the benzo(a)pyrene content, the once-treated tar solution containing 19 ppb benzo(a)pyrene was subjected to a second batch treatment with a second 60 g sample of Resin 7. The resulting mixture of tar solution and resin again was stirred for one hour, followed by filtering the resin from the tar solution, and assaying the tar solution for benzo(a)pyrene. The twice-treated tar solution contained less than 1 ppb benzo(a)pyrene, therefore indicating an additional removal of hydrocarbons of greater than 94.5%.

In summary, batch treating a tar solution (2500 ml) containing 200 ppb benzo(a)pyrene with a total of 120 g of Resin 7, i.e., a ratio of about 21 volume parts of tar to 1 weight part of resin, reduced the benzo(a)pyrene content to less than 1 ppb, i.e., greater than 99.5% removal of hydrocarbons from the tar solution. The resulting smoke coloring and flavoring composition is acceptable for application to a foodstuff.

To illustrate that hydrocarbons are effectively removed from a tar solution in a preferred continuous process, the second 1500 ml portion of the tar solution likewise is diluted with 1000 ml of water to provide a tar solution (2500 ml) containing 200 ppm benzo(a)pyrene. This tar solution is passed over a resin bed containing 120 g of Resin 7, i.e., a ratio of about 21 volume parts of tar solution to 1 weight per of resin. The resin bed is in the form of a chromatography column. The contact time between the resin and the tar solution flowing through the column is about 45 minutes.

This continuous method effectively reduces the benzo(a)pyrene content of the tar solution to less than about 1 ppb, or greater than 99.5% removal of hydrocarbons from the tar solution, with a single pass of the tar solution through the column.

The treated tar solution can be used to color and flavor foodstuffs because the hydrocarbon content, and especially the benzo(a)pyrene content, is within industry-accepted limits. The tar solutions also effectively color and flavor foodstuffs because only nonpolar hydrocarbons, including solubilized hydrocarbons, are removed from the tar solution, while neutralized and polar compounds, like phenolics, that color and flavor a foodstuff are retained in the tar solution.

Many modifications and variations of the invention as hereinbefore set forth can be made without departing from the spiritual scope thereof and, therefore, any such limitations should be imposed as are indicated by the appended claims.

What is claimed is:

1. A method of preparing a smoke coloring and flavoring composition comprising:
    (a) forming a tar solution comprising: (i) a hydrocarbon and benzo(a)pyrene-containing tar by-product from the pyrolysis of wood and (ii) an aqueous alkali, said tar solution having a pH of about 10 to about 13; and
    (b) contacting the tar solution of step (a) with a sufficient amount of a nonionic, aromatic hydrocarbon-based resin for a sufficient time to provide a smoke coloring and flavoring composition having a benzo(a)pyrene content of about 10 ppb or less.

2. The method of claim 1 wherein at least 80% of hydrocarbons present in the tar solution of step (a) are removed in step (b).

3. The method of claim 1 wherein at least 90% of hydrocarbons present in the tar solution of step (a) are removed in step (b).

4. The method of claim 1 wherein at least 95% of hydrocarbons present in the tar solution of step (a) are removed in step (b).

5. The method of claim 1 wherein the smoke coloring and flavoring composition has a benzo(a)pyrene content of 1 ppb or less.

6. The method of claim 1 wherein the smoke coloring and flavoring composition has a benzo(a)pyrene content of 0.5 ppb or less.

7. The method of claim 1 wherein, in step (b), one gram of the resin is used to contact about 10 to about 50 milliliters of the tar solution.

8. The method of claim 1 wherein, in step (b), one gram of the resin is used to contact about 10 to about 40 milliliters of the tar solution.

9. The method of claim 1 wherein the resin has a porosity of about 40% to about 70% by volume, a surface area of about 200 to about 2000 $m^2/g$, an average pore diameter of about 40 to about 500 Å, and a density of about 1 to about 1.5 mg/ml.

10. The method of claim 1 wherein the resin comprises a crosslinked aromatic polymer.

11. The method of claim 10 wherein the resin comprises 0% to about 10% by weight of an acrylic ester, a methacrylic ester, a diester of an unsaturated dicarboxylic acid, or a mixture thereof.

12. The method of claim 1 wherein the aromatic hydrocarbon-based resin is free of functional groups.

13. The method of claim 1 wherein the resin comprises a divinylbenzene-ethylvinylbenzene copolymer.

14. The method of claim 1 wherein the resin comprises a divinylbenzene-styrene copolymer.

15. The method of claim 1 wherein the resin is hydrophobic.

16. The method of claim 1 wherein the resin is nonpolar.

17. The method of claim 1 wherein the tar solution and the resin are contacted in a batch process for about 10 to about 120 minutes.

18. The method of claim 1 wherein the tar solution and the resin are contacted in a continuous process, wherein the tar solution is passed through a column, having a bed containing the resin, at a rate of about 0.1 to about 2 bed volumes per hour.

19. The method of claim 1 wherein the aqueous alkali comprises about 5% to about 50% by weight of an alkali in water.

20. The method of claim 19 wherein the alkali is selected from the group consisting of sodium hydroxide, potassium hydroxide, ammonium hydroxide, sodium carbonate, sodium bicarbonate, trisodium phosphate, disodium phosphate, and mixtures thereof.

21. The method of claim 1 wherein the tar is a by-product from the pyrolysis of oak, hickory, maple, birch, beech, cherry, ash, poplar, a member of the Carya genus, and mixtures thereof.

22. The method of claim 1 wherein the tar solution comprises 1 volume part of tar and about 0.5 to about 4 volume parts of the aqueous alkali.

23. The method of claim 1 wherein the tar solution has a pH of about 10.5 to about 12.

24. The method of claim 1 wherein the smoke coloring and flavoring composition has a color value of at least 200.

25. The method of claim 1 wherein the smoke coloring and flavoring composition has a color value of at least 300.

26. The method of claim 1 wherein the smoke coloring and flavoring composition has a color value of about 200 to about 1500.

27. A method of preparing a smoke coloring and flavoring composition comprising:

(a) forming an aqueous tar mixture comprising: (i) a benzo(a)pyrene-containing tar by-product from the pyrolysis of wood and (ii) an aqueous alkali, said aqueous tar mixture having a pH of about 10 to about 13;

(b) allowing the aqueous tar mixture of step (a) to separate into an organic phase and an aqueous tar solution phase;

(c) isolating the aqueous tar solution phase from the organic phase; and (d) contacting the aqueous tar solution phase with a nonionic, aromatic hydrocarbon-based resin, in an amount of about 10 to about 50 milliliters of the aqueous tar solution phase per gram of the resin, for a sufficient time to provide a smoke coloring and flavoring composition having a benzo(a)pyrene content of about 10 ppb or less.

* * * * *